Dec. 1, 1936.    M. R. BENTLEY ET AL    2,062,388
DEVICE FOR MEASURING LAND
Filed Feb. 21, 1936    3 Sheets-Sheet 1

Inventor
M. R. BENTLEY
R. R. REPPERT

By
Attorney

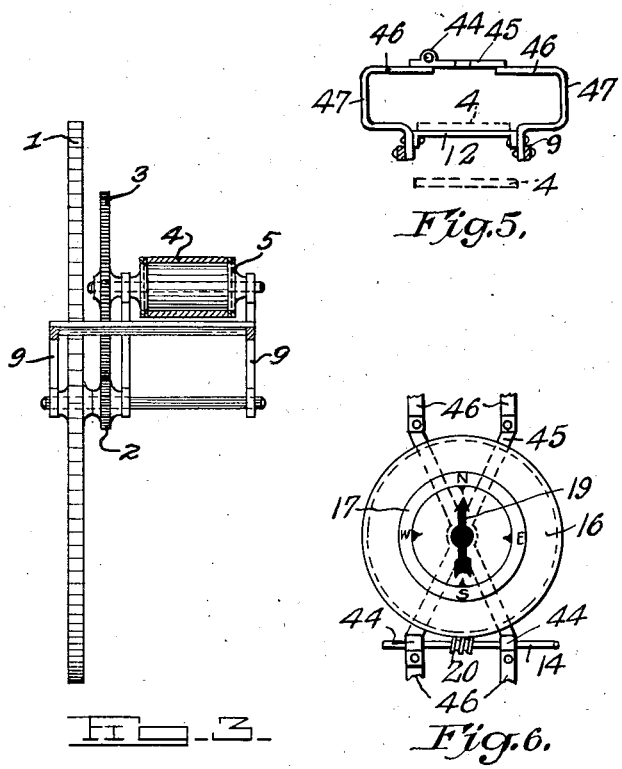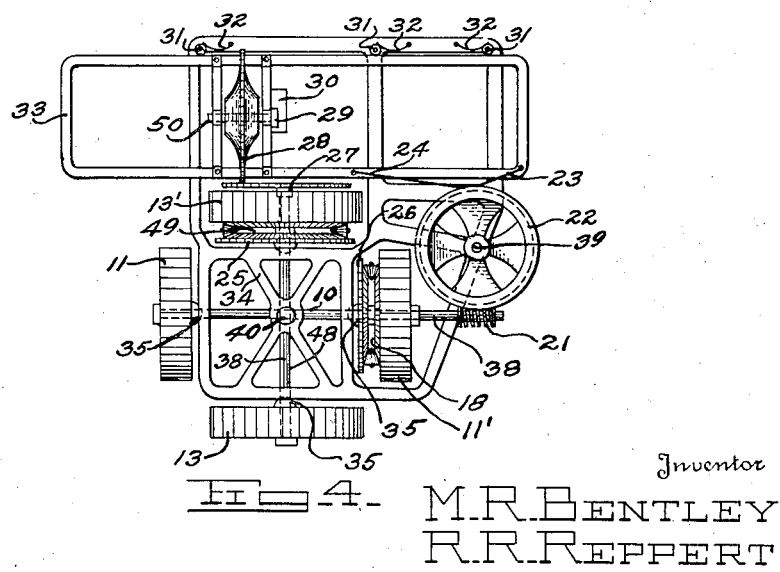

Dec. 1, 1936.  M. R. BENTLEY ET AL  2,062,388
DEVICE FOR MEASURING LAND
Filed Feb. 21, 1936  3 Sheets-Sheet 3
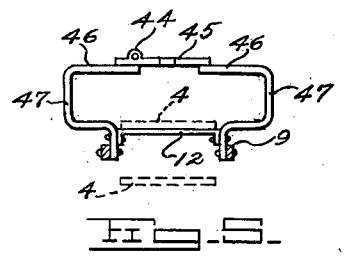
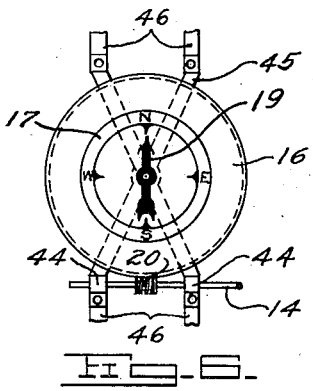
Inventor
M.R.BENTLEY
R.R.REPPERT
By
Attorney Patented Dec. 1, 1936

2,062,388

UNITED STATES PATENT OFFICE 2,062,388

DEVICE FOR MEASURING LAND

Maurice R. Bentley and Roy R. Reppert,
Bryan, Tex.

Application February 21, 1936, Serial No. 65,076

1 Claim. (Cl. 33—124)

(Granted under the act of March 3, 1883, as
amended April 30, 1928; 370 O. G. 757)

This application is made under the act of March 3, 1883, as amended by the act of April 30, 1928, and the invention herein described and claimed may be manufactured and used by or for the Government for governmental purposes without the payment to us of any royalty thereon.

The object of this invention is to measure quickly and accurately the area of plots of land, of whatever irregular outline, by the simple procedure of rolling about the outer limits a wheel, beginning at one point, this wheel operating a mechanism in such manner that when the entire circuit is completed and the machine returned to its position at the starting point, the area included within the path traversed has been measured and recorded on a dial from which it may be directly read.

In applying for this patent, it is understood that, although the immediate purpose of the machine is to measure land areas, its application is not limited to this particular purpose, but may be utilized in its essential parts for other purposes, as for instance, the measuring and mapping as to direction and distance of roadways, etc.

Our invention is illustrated in the accompanying drawings, in which similar numerals refer to similar parts throughout the several views.

Figure 3 is a vertical sectional view taken on line 3—3 of Figure 1.

Figure 4 is an enlarged plan view of the rolling wheel assembly, with counting device.

Figure 5 is a front elevation of belt plate assembly.

Figure 6 is a plan view of compass, with orienting device.

Figure 1:
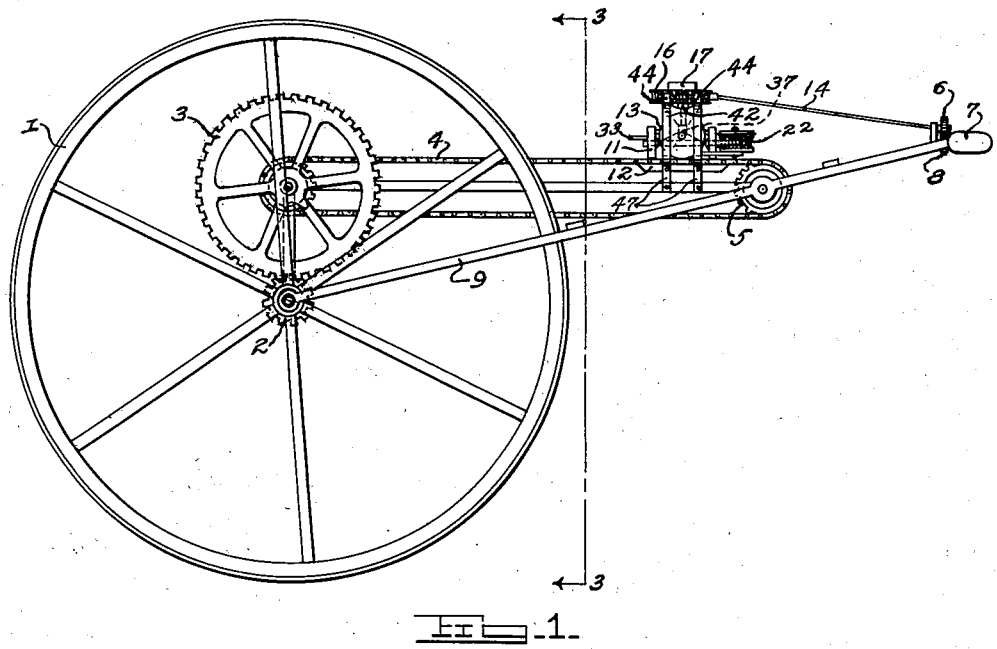
Figure 1 is a side elevation of our apparatus.

By referring to the drawings, it will be seen that measuring wheel 1, rolling in contact with the ground (not shown), imparts motion through gears 2 and 3 and driving sprocket 5, by means of sprocket (not shown) firmly attached (by any suitable means, not shown) to edges of belt 4, to insure positive movement, without slipping.

At one place in its course, stationary with the framework of the machine, plate 12 is placed beneath belt 4 in order to insure smooth contact of the belt 4 with the roller wheels, hereinafter described, operating directly above. To this plate 12 is securely fastened upright supports 47, continuous with or firmly attached to, horizontal cross-pieces 46 and framework 45, this entire assembly forming a means whereby the roller wheel assembly may completely rotate beneath it in a horizontal plane. This is made possible through vertical post 40 passing through framework 45, post 40 being firmly attached above to collar 42 of the orienting wheel 16 by any suitable means (not shown) and below to collar 37 of roller wheel assembly by any suitable means (not shown), thus making orienting wheel 16 and attached compass 17 rigid with roller wheel assembly framework 34.

Proper orientation is secured by turning handle 7 in the proper direction. Rotation is thereby imparted through gears 6 and 8 to shaft 14, supported at its distal end in bearings 44 attached to rigid framework 45. Through worm gear 20, this shaft turns wheel 16 and thus orients the roller wheel assembly.

Figure 2:
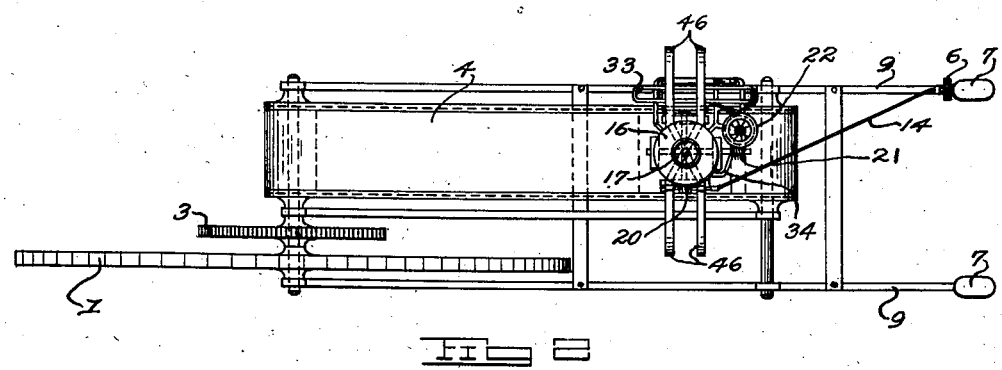
Figure 2 is a plan view of our apparatus.

The essential part of the machine, that of the roller wheel assembly, can best be understood by reference to Figure 2, supplemented by reference also to Figure 4 to clarify points otherwise uncertain.

Roller wheels 13 and 13' operate together to measure off distance in one direction with respect to the compass 17, being held to that direction by the orienting device shown in detail in Figures 2 and 5. These wheels 13 and 13', as also wheels 11 and 11', are striated on their rolling surface exactly parallel to their axes, to prevent slipping on the belt 4 over which they roll, and to insure that the measurements of distance are accurate.

Roller wheels 11 and 11' have their axis placed at an exact right angle to that of 13 and 13' and measure distance in a direction at right angles to that measured by 13 and 13'. The diameter of wheels 11 and 11' is less than that of wheels 13 and 13', to permit crossing of the respective axes. The purpose of these two sets of wheels is to break up the distance over which wheel 1 moves in its contact with the ground in any direction, into two coordinate directions at right angles to each other, the direction in which these two distances are measured being determined with respect to the compass.

Through differential gear 49 motion of wheels 13 and 13' is equalized, and through differential gear 18 that of wheels 11 and 11' is equalized; so that measurement of distance in coordinate directions is, as of a point at the intersection of axes 10 and 48, moving over belt 4 below. Differential gears 18 and 49 are made necessary in order to equalize motion of their respective pairs of wheels as this assembly is kept oriented over belt 4.

It will be seen then that all of these wheels contact belt 4 at the same time. The movement of the belt under the roller wheel assembly imparts the same motion to the two sets of wheels as would be the case if these wheels were drawn over a smooth ground surface itself around the border of the field. Only in special instances will either set of wheels move over the belt at right angles to their axes; in other cases dragging sidewise but each measuring the distance at right angles to its own axis, the two together being component distances of that travelled by the belt.

The combined movement of wheels 13 and 13' is transmitted through differential 49 and shaft 48 to disk 27, against which wheel 28 operates. This wheel through its axis 50 turns dial 29, graduated on its circumference to register fractions of acres, or other units of surface measurement. A counting device, geared to 29 and enclosed in box 30, indicates acres in ones, tens and hundreds.

The combined movement of wheels 11 and 11' is transmitted through differential 18 and shaft 10 by means of worm gear 21 to wheel 22. Taut wires 23 and 24 attached securely to the periphery of the wheel 22, and extending circumferentially in opposite directions, serve to draw moveable frame 33 on which is mounted counting wheel 28, in one direction or the other, over the framework 34 of the roller wheel assembly. Frame 33 is so attached to frame 34 that wheel 28 contacts disk 27 along a diameter of the latter and the rate of rotation of wheel 28 is therefore dependent not only upon the rate of rotation of wheels 13 and 13', whether in a positive or negative direction, but also upon the distance, whether positive or negative, of its point of contact with disk 27 from center of same. This radial distance being determined by the distance already traversed by wheels 11 and 11'. Rollers 31 facilitate draft of frame 33 over frame 34 and springs 32 hold these rollers against frame 33, insuring continuous close contact of counting wheel 28 against disk 27.

In the operation of this machine, carrying frame 33 is drawn back against springs 32, thus releasing wheel 28 from its contact with disk 27 and enabling the counting dials to be set at zero. With measuring wheel 1 directed in its path and ready to start in this path counter-clockwise about the edge of the field or area to be measured, the roller wheel assembly is oriented by means of handle 7 until any given direction as inscribed on the dial of the compass, as for instance north coincides with the compass needle itself. Thereafter, as the machine is pushed along the edge of the field, by means of the orienting device, this chosen point of the campass is kept always under the needle, so that the two sets of roller wheels move along in their respective directions at right angles to each other, thereby measuring coordinate distances, and together, through the counting wheel 28 and its assembly of dials, automatically registering the area included within the path traversed.

The function of handle 7 should now appear. It is to keep these two sets of wheels which we have previously designated as the roller wheel assembly properly oriented with respect to the compass. The handle may be turned in either direction, rotating this roller wheel assembly in either direction as may be necessary to keep it oriented. It will appear that in going about the field and returning to the starting point, one complete rotation of this roller wheel assembly about a vertical axis must be accomplished, although in making turns right or left in following the outline of an irregular field it will be found necessary to move in a clockwise direction or in a counter-clockwise direction as these irregularities may make it necessary in order to keep the assembly oriented.

As the machine progresses about the edge of the field, whether of regular or irregular outline, through a process of addition and subtraction, the total of the included area is finally registered on the dial when the machine is returned to its position at the starting point.

The function of wheels 11 and 11' is to transmit through differential 18, axis 10, and worm gear 21, motion to the right or left (according as these wheels move in a positive or negative direction) to wheel 22, thereby drawing, through the agency of wires 23 and 24, carriage 33 to one side, or the other, and counter wheel 28 is moved toward the center of disk 27 or away from it. This motion may be such as to bring the periphery of this counter wheel 28 over the center of disk 27, in which case no rotation is imparted to wheel 28 or to the right, in which case rotation of wheel 28 is in a negative direction. Disk 27 is driven through differential 49 by the other set of wheels 13—13', thereby measuring distances in the other coordinate direction.

Other numbers in the figures to which reference has not already been made are: Compass needle 19; plate 25, attached to roller wheel 13 through connecting axis 38, moving in conjunction therewith and imparting motion to differential 49; plate 26, similar to plate 25, moving in conjunction with roller wheel 11'; bearings 35 of roller wheels 11 and 11'; axes 38, connecting roller wheels 11 and 13 with their respective differential plates 26 and 25; and bearing 39, whereon turns wheel 22.

Having thus described our invention and the manner of its operation, what we claim for Letters Patent is:

In an apparatus of the character described, comprising a frame; a ground contacting wheel axially mounted thereon; a small gear affixed to the hub of said wheel; a large gear in engagement with said small gear; a sprocket affixed to the hub of said large gear; a sprocket mounted on said frame; a chain belt adapted to connect said sprockets; a roller wheel assembly, comprising upright supports mounted on said frame, a plate affixed to said supports and adapted to contact the under side of said belt, an upwardly mounted plate affixed to said support; a vertical post affixed to said plate, axles mounted axially at right angles on said post, roller wheels mounted on said axles and adapted to frictionally contact and to be activated by said belt, plates mounted on said axles, means adapted to contact the inner side of said roller wheels and said plates, a disk mounted on one of said axles; a counting wheel adapted to be frictionally revolved by said plate; and means for orienting said roller wheel assembly.

MAURICE R. BENTLEY.
ROY R. REPPERT.